(12) United States Patent
Hunger

(10) Patent No.: US 12,135,181 B1
(45) Date of Patent: Nov. 5, 2024

(54) SLIDING GUN REST SYSTEM AND METHOD OF USE

(71) Applicant: Drew F. Hunger, Katy, TX (US)

(72) Inventor: Drew F. Hunger, Katy, TX (US)

( * ) Notice: Subject to any disclaimer, the term of this patent is extended or adjusted under 35 U.S.C. 154(b) by 0 days.

(21) Appl. No.: 16/997,352

(22) Filed: Aug. 19, 2020

(51) Int. Cl.
*A01M 31/02* (2006.01)
*F41A 23/02* (2006.01)

(52) U.S. Cl.
CPC ........... *F41A 23/02* (2013.01); *A01M 31/025* (2013.01)

(58) Field of Classification Search
CPC .......... F41A 23/16; F41A 23/24; F41A 23/02; F41A 23/04; F41A 27/22; F41A 27/24; A01M 31/025
USPC ................................................. 42/94; 211/64
See application file for complete search history.

(56) References Cited

U.S. PATENT DOCUMENTS

| | | | |
|---|---|---|---|
| 2,291,747 A | 8/1942 | Herman | |
| 2,329,932 A | 9/1943 | Nelson | |
| 2,658,777 A | 11/1953 | Rauglas | |
| 3,126,187 A | 3/1964 | Mooney | |
| 3,228,647 A | 1/1966 | Musianowycz | |
| 3,666,311 A | 5/1972 | McMullin | |
| 3,807,574 A | 4/1974 | Lanza | |
| 3,835,486 A | 9/1974 | Benoit et al. | |
| 4,007,554 A | 2/1977 | Helmstadter | |
| 4,188,007 A | 2/1980 | Ubezio | |
| 4,345,398 A | 8/1982 | Pickett | |
| 4,374,581 A | 2/1983 | Karapita | |
| 4,393,614 A | 7/1983 | Pickett | |
| 4,501,082 A | 2/1985 | Phillips et al. | |
| 4,506,466 A | 3/1985 | Hall | |
| 4,535,559 A | 8/1985 | Hall | |
| 4,563,829 A | 1/1986 | Bozick | |
| 4,575,964 A | 3/1986 | Griffin | |
| 4,580,483 A | 4/1986 | Garbini | |
| 4,702,029 A | 10/1987 | DeVaul et al. | |
| 4,719,716 A | 1/1988 | Chrisley, Jr. | |
| 4,854,066 A | 8/1989 | Canterbury, Sr. | |
| 4,876,814 A | 10/1989 | Lombardo | |
| 4,913,391 A * | 4/1990 | Klipp | F41A 23/02 248/231.71 |
| 4,924,616 A | 5/1990 | Bell | |
| 4,937,965 A | 7/1990 | Narvaez | |
| 4,987,694 A | 1/1991 | Lombardo | |
| 4,998,944 A | 3/1991 | Lund | |
| 5,011,104 A | 4/1991 | Fang | |
| 5,039,052 A | 8/1991 | Carafice | |
| 5,044,590 A | 9/1991 | Carafice | |
| 5,050,330 A | 9/1991 | Pilgrim et al. | |
| 5,070,636 A * | 12/1991 | Mueller | F41A 23/16 73/167 |
| 5,173,563 A | 12/1992 | Gray | |
| 5,241,772 A | 9/1993 | Hall | |
| 5,272,955 A | 12/1993 | Bond et al. | |
| 5,311,693 A | 5/1994 | Underwood | |
| 5,317,826 A | 6/1994 | Underwood | |

(Continued)

*Primary Examiner* — Jonathan C Weber
(74) *Attorney, Agent, or Firm* — Hitchcock Evert LLP

(57) ABSTRACT

A sliding gun rest system allows a person to sit or stand in a blind or the like and have their rifle supported in a rest. When the rifle needs to move the rest slides along the windowsill without the person having to move or dance around a fixed rest. The rest pivots about the point where it attaches to the rail. The rest or rail could also have brakes that lock the rest in place and allow for a stable and steady shot.

1 Claim, 5 Drawing Sheets

(56) References Cited

U.S. PATENT DOCUMENTS

| | | | |
|---|---|---|---|
| 5,332,185 | A | 7/1994 | Walker, III |
| 5,351,867 | A | 10/1994 | Vest |
| 5,377,437 | A | 1/1995 | Underwood |
| 5,419,233 | A | 5/1995 | Mulvaney |
| 5,421,115 | A | 6/1995 | McKay |
| 5,481,817 | A * | 1/1996 | Parker .................... F41A 23/02 |
| | | | 248/286.1 |
| 5,589,903 | A | 12/1996 | Speggiorin |
| 5,600,913 | A | 2/1997 | Minneman |
| D381,388 | S | 7/1997 | Raia |
| D382,035 | S | 8/1997 | Swicegood |
| 5,666,757 | A | 9/1997 | Helmstadter |
| 5,685,104 | A | 11/1997 | Breazeale, Jr. |
| 5,697,537 | A | 12/1997 | Bowlsby |
| 5,697,757 | A | 12/1997 | Lindsay |
| 5,715,624 | A | 2/1998 | Hilbelink et al. |
| 5,715,625 | A | 2/1998 | West, III |
| 5,716,062 | A | 2/1998 | Lindsay |
| 5,738,256 | A | 4/1998 | Goff et al. |
| 5,778,589 | A * | 7/1998 | Teague .................... F41A 23/02 |
| | | | 89/37.01 |
| 5,845,427 | A | 12/1998 | Taylor |
| 5,903,995 | A | 5/1999 | Brubach |
| 5,913,667 | A | 6/1999 | Smilee |
| 5,913,668 | A | 6/1999 | Messer |
| 5,930,931 | A | 8/1999 | Watson |
| 5,933,999 | A | 8/1999 | McClure et al. |
| 5,953,846 | A | 9/1999 | Shelton |
| 5,964,435 | A | 10/1999 | Peltier |
| 5,971,334 | A | 10/1999 | Crawshaw et al. |
| 5,974,719 | A | 11/1999 | Simonek |
| 6,019,556 | A | 2/2000 | Hess |
| 6,035,572 | A | 3/2000 | Goode, Jr. |
| 6,044,747 | A | 4/2000 | Felts |
| 6,086,031 | A | 7/2000 | Renfro |
| 6,158,159 | A | 12/2000 | Zekas |
| 6,176,169 | B1 | 1/2001 | Rostocil |
| 6,192,613 | B1 | 2/2001 | Lantz |
| 6,243,979 | B1 | 6/2001 | Seats et al. |
| 6,263,776 | B1 | 7/2001 | Rostocil |
| 6,276,087 | B1 | 8/2001 | Singletary |
| 6,283,428 | B1 | 9/2001 | Maples et al. |
| 6,305,116 | B1 | 10/2001 | Parker |
| 6,315,256 | B1 | 11/2001 | Tolar |
| D461,519 | S | 8/2002 | Monteer |
| D471,248 | S | 3/2003 | Jacobs |
| 6,526,687 | B1 | 3/2003 | Looney |
| 6,539,660 | B1 | 4/2003 | Yeargin |
| 6,564,790 | B2 | 5/2003 | Graham |
| 6,574,899 | B1 * | 6/2003 | Mostello ................ F41A 23/16 |
| | | | 42/94 |
| 6,578,309 | B1 | 6/2003 | Frisce |
| 6,629,380 | B2 | 10/2003 | Yeargin |
| 6,634,530 | B1 | 10/2003 | Black |
| 6,694,661 | B1 | 2/2004 | Langford |
| 6,726,163 | B2 | 4/2004 | Eppard et al. |
| 6,749,099 | B2 | 6/2004 | Danielson |
| 6,802,483 | B1 | 10/2004 | Leasure |
| 6,871,440 | B2 | 3/2005 | Highfill et al. |
| 6,883,263 | B1 | 4/2005 | Carrow |
| D506,521 | S | 6/2005 | Strahan |
| 6,920,713 | B1 | 7/2005 | Love |
| 6,931,777 | B1 | 8/2005 | Krien |
| 6,935,064 | B1 | 8/2005 | Thompson |
| 6,935,065 | B1 | 8/2005 | Oliver |
| 6,945,441 | B2 | 9/2005 | Gates et al. |
| D515,614 | S | 2/2006 | Speggiorin |
| 7,066,365 | B2 | 6/2006 | Brown |
| 7,066,435 | B2 | 6/2006 | Oddsen et al. |
| 7,086,192 | B2 | 8/2006 | Deros |
| 7,124,530 | B1 | 10/2006 | Clark |
| 7,188,445 | B2 | 3/2007 | Lehman |
| D551,734 | S | 9/2007 | Barker et al. |
| 7,311,048 | B2 | 12/2007 | Kopala, Jr. |
| 7,313,884 | B2 | 1/2008 | Eddins |
| 7,415,790 | B1 | 8/2008 | Ruhland et al. |
| 7,454,859 | B2 | 11/2008 | Buckner |
| 7,493,719 | B2 | 2/2009 | Lackey |
| 7,506,470 | B2 | 3/2009 | Pereksta |
| 7,676,978 | B2 * | 3/2010 | Marlatt .................... F41A 23/02 |
| | | | 42/94 |
| 7,726,478 | B2 | 6/2010 | Potterfield et al. |
| 7,770,319 | B2 | 8/2010 | McDonald |
| 7,779,572 | B2 | 8/2010 | Potterfield et al. |
| 7,784,212 | B1 | 8/2010 | Chilton |
| 7,823,317 | B2 | 11/2010 | Potterfield et al. |
| 7,845,267 | B2 | 12/2010 | Potterfield et al. |
| 7,845,602 | B1 | 12/2010 | Young et al. |
| 7,930,852 | B1 | 4/2011 | Hubbard, Jr. |
| 7,946,071 | B2 | 5/2011 | Cauley |
| 7,954,272 | B2 | 6/2011 | Potterfield et al. |
| 7,958,663 | B2 | 6/2011 | Saunders, III |
| 7,980,017 | B2 | 7/2011 | Harman, III |
| 7,997,021 | B2 | 8/2011 | Cauley et al. |
| 8,011,129 | B2 | 9/2011 | Cauley et al. |
| 8,104,212 | B2 | 1/2012 | Potterfield et al. |
| 8,104,214 | B2 | 1/2012 | Boord |
| 8,132,351 | B2 | 3/2012 | Potterfield et al. |
| 8,146,876 | B1 | 4/2012 | Young et al. |
| 8,176,670 | B2 | 5/2012 | Boord |
| 8,256,732 | B1 | 9/2012 | Young et al. |
| 8,296,988 | B2 | 10/2012 | Yale et al. |
| 8,297,565 | B2 | 10/2012 | McLinda |
| 8,307,576 | B1 | 11/2012 | Bogart et al. |
| 8,316,570 | B2 | 11/2012 | Potterfield et al. |
| 8,316,572 | B2 | 11/2012 | Saunders, III |
| 8,322,067 | B2 | 12/2012 | Boord |
| 8,327,570 | B2 | 12/2012 | Potterfield et al. |
| 8,356,442 | B2 | 1/2013 | Potterfield et al. |
| 8,393,106 | B2 | 3/2013 | Cauley et al. |
| 8,434,594 | B2 | 5/2013 | Zinsmeyer |
| 8,464,460 | B1 | 6/2013 | Runyan |
| 8,464,628 | B2 | 6/2013 | Potterfield et al. |
| 8,469,326 | B1 | 6/2013 | Young et al. |
| 8,516,733 | B1 | 8/2013 | Richey, Jr. et al. |
| 8,539,709 | B2 | 9/2013 | Otto |
| 8,544,202 | B2 | 10/2013 | Bastian, Jr. |
| 8,549,786 | B1 | 10/2013 | Griffith |
| 8,578,645 | B2 | 11/2013 | Cauley |
| 8,590,440 | B2 | 11/2013 | Gallo |
| 8,621,773 | B2 | 1/2014 | Morrow et al. |
| 8,683,909 | B1 | 4/2014 | Copus |
| 8,695,935 | B1 | 4/2014 | Kasbohm |
| 8,714,508 | B1 | 5/2014 | Young et al. |
| 8,813,407 | B1 | 8/2014 | Sargent et al. |
| 8,894,024 | B2 | 11/2014 | Deros |
| 8,931,193 | B1 | 1/2015 | Bogart et al. |
| 8,931,201 | B2 | 1/2015 | Gianladis et al. |
| 9,010,710 | B1 | 4/2015 | Young et al. |
| 9,151,561 | B2 | 10/2015 | Morrow et al. |
| 9,163,893 | B1 * | 10/2015 | Gutierrez ................ F41A 23/02 |
| 9,200,858 | B2 | 12/2015 | Bull |
| 9,200,859 | B2 | 12/2015 | Antell |
| 9,279,535 | B2 | 3/2016 | Parrott |
| 9,297,601 | B2 | 3/2016 | White |
| 9,505,352 | B2 | 11/2016 | Fife |
| 9,557,131 | B1 | 1/2017 | Antell |
| 9,568,265 | B2 | 2/2017 | Bastian, Jr. |
| 9,618,291 | B1 | 4/2017 | Henderson |
| 9,625,229 | B1 * | 4/2017 | Hilz ....................... F41A 23/02 |
| 9,702,653 | B2 | 7/2017 | Cauley, Jr. et al. |
| 9,746,268 | B2 | 8/2017 | Antell |
| 9,772,158 | B1 | 9/2017 | Staton |
| 9,797,673 | B2 * | 10/2017 | Gutierrez ................ F41A 23/02 |
| D802,885 | S | 11/2017 | DeWeever |
| 9,823,047 | B2 | 11/2017 | Lupher et al. |
| 9,903,680 | B2 | 2/2018 | Linderwell |
| 9,976,693 | B1 * | 5/2018 | Delikat .................... A01M 31/02 |
| 10,139,182 | B2 | 11/2018 | Duncan et al. |
| D837,923 | S | 1/2019 | Gleick et al. |
| 10,175,020 | B2 | 1/2019 | Newcomb |
| 10,184,747 | B1 | 1/2019 | Courter |
| 10,209,023 | B1 * | 2/2019 | Stuart ..................... F41A 23/18 |
| D846,058 | S | 4/2019 | Dennett |

(56) References Cited

U.S. PATENT DOCUMENTS

| | | |
|---|---|---|
| 10,288,382 B1 | 5/2019 | Pollock |
| 10,317,162 B2 | 6/2019 | Morrow et al. |
| 10,352,645 B1 | 7/2019 | Antell |
| 10,415,921 B1 | 9/2019 | Nousiainen |
| 10,429,147 B2 | 10/2019 | Williams et al. |
| 10,474,013 B2 | 11/2019 | Wynalda, Jr. et al. |
| 10,514,225 B2 | 12/2019 | Cauley, Jr. et al. |
| 11,624,578 B1 * | 4/2023 | Dallenbach ............. F41A 23/16 42/94 |
| 2002/0184692 A1 | 12/2002 | Mullis |
| 2006/0254114 A1 * | 11/2006 | Lehman ................ F41A 23/16 42/94 |
| 2009/0031744 A1 | 2/2009 | D'Souza |
| 2009/0223106 A1 * | 9/2009 | Marlatt ................ F41A 23/02 42/94 |
| 2014/0352193 A1 | 12/2014 | Bull |
| 2016/0076846 A1 | 3/2016 | Melancon |
| 2017/0191783 A1 * | 7/2017 | Gutierrez .............. F41A 23/02 |

\* cited by examiner

SLIDING GUN REST SYSTEM AND METHOD OF USE

BACKGROUND

1. Field of the Invention

The present invention relates generally shooting systems and methods, and more specifically, to a sliding gun rest system that fits in or near a window or similar opening in a blind or hut and allows a firearm to rest thereon and be positioned towards different directions with a natural and fluid movement.

2. Description of Related Art

Shooting systems are well known in the art and are effective means to discharge projectiles such as bullets for hunting, self-defense and the like. For example, when hunting, a person will locate a target, take aim at it and discharge a firearm that will force a projectile towards the target. In some forms of hunting, a blind or stand is erected, and the hunter will wait for the target to come close to their location. While stands and holders for firearms have been developed, they commonly support the firearm as to require the person operating the firearm to move their position while the firearm remains generally still.

One of the problems associated with common shooting systems used in blinds is their limited use. For example, when the hunter is in a blind the firearm must be constantly at the ready. Holding the firearm in this position is tedious and tiring and the hunter's accuracy is negatively impacted. Attempts to relieve this deficiency have resulted in supports and stands that range from a pole to support the firearm to complex holders that both support and aim the firearm. Commonly, shooting systems intrude into the limited space of the blind which restricts their use through a single window, typically the forward-facing window. These shooting systems require that the firearm must be pivoted about a fixed point, this necessitates that the person that operates the firearm must move about the fixed point. While hunting, this movement could disturb the target and reduce the opportunity and the ability to aim and fire at it.

Accordingly, although great strides have been made in the area of shooting systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
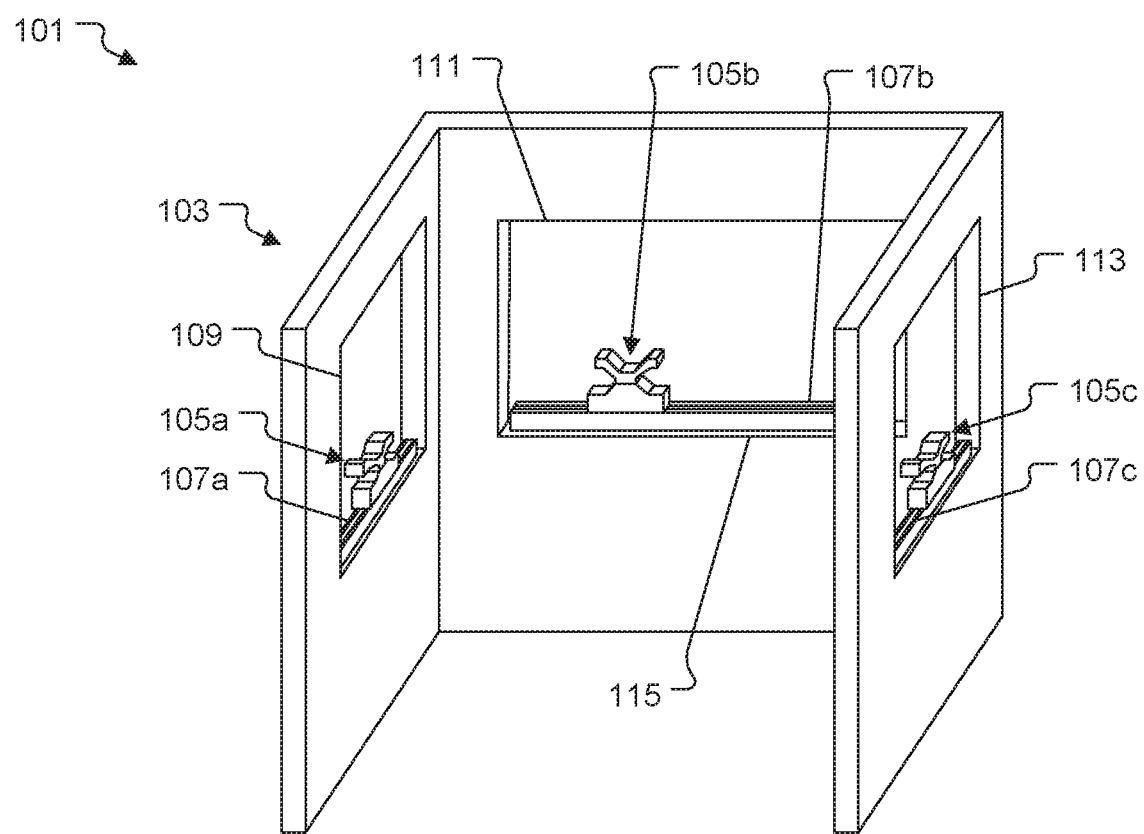
FIG. 1 is a back-isometric view of a sliding gun rest system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional shooting systems. Specifically, the present invention enables the rapid aiming of a firearm without the hunter moving their position and enables the use of the firearm out of multiple windows in a blind. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a back-isometric view of a sliding gun rest system mounted in multiple windows of a blind, in accordance with a preferred embodiment of the present application. It will be appreciated that system 101 overcomes one or more of the above-listed problems commonly associated with conventional shooting systems.

In the contemplated embodiment, system 101 includes a shelter 103 with a first window 109, a second window 111 and a third window 113. Each window has a rest 105 slidingly attached to a rail 107 in the bottom or sill thereof. The rests 105 are configured to hold and support a firearm.

Figure 2:
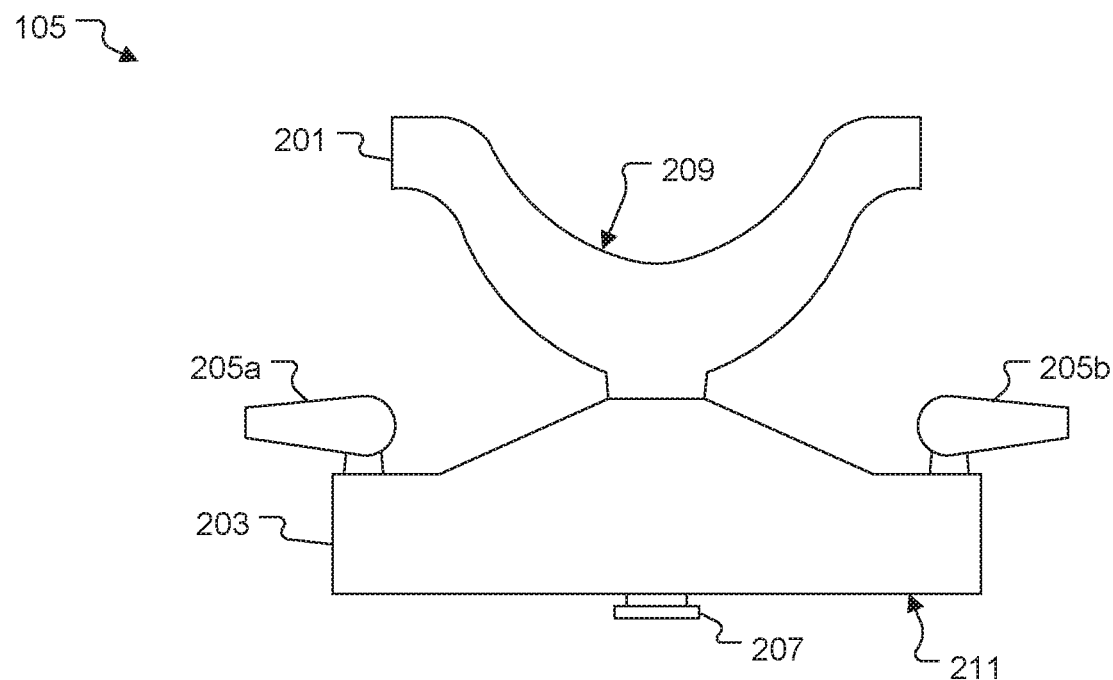
FIG. 2 is a front view of the rest of FIG. 1.
Figure 3:
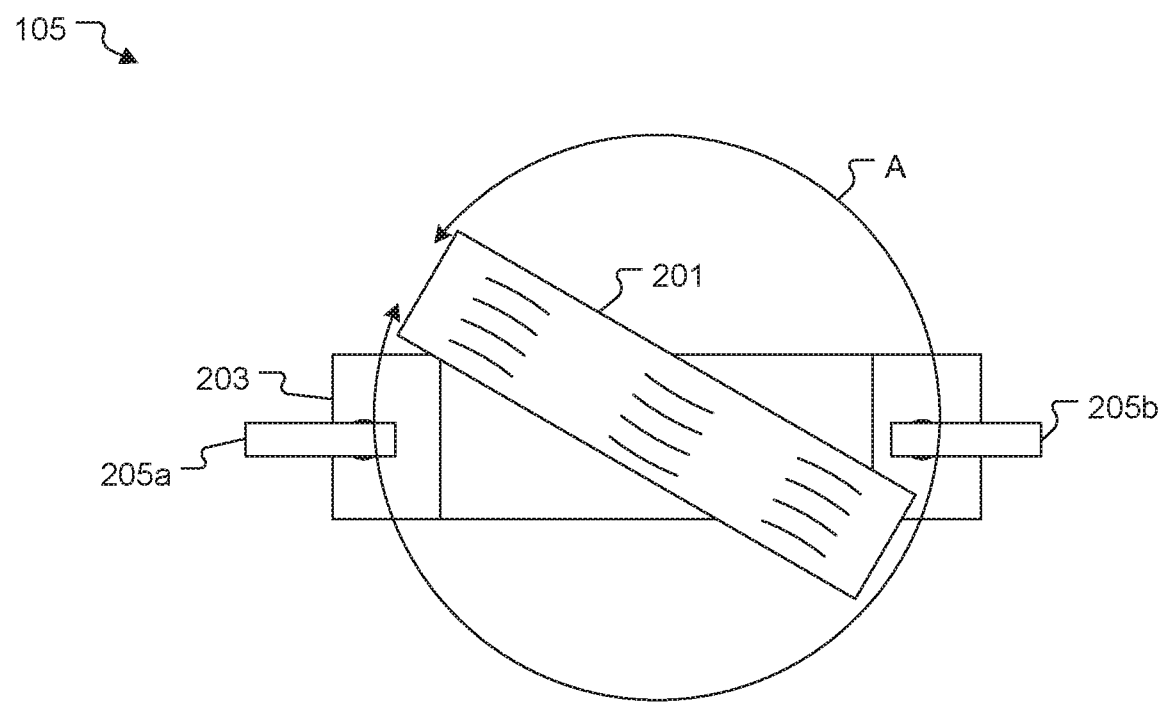
FIG. 3 is a top view of the rest of FIG. 1.

As depicted by FIG. 2, the rest 105 further includes a first body 201 with a concave upper surface 209. The first body is rotationally attached to a second body 203 and a slide 207 is attached to the bottom surface 211 of the second body 203. Brakes 205 are attached to the second body 203 and are configured to hold the rest 105 motionless with respect to the rail 107. As depicted by motion A of FIG. 3, the first body 201 rotates with respect to the second body 203.

Figure 4:
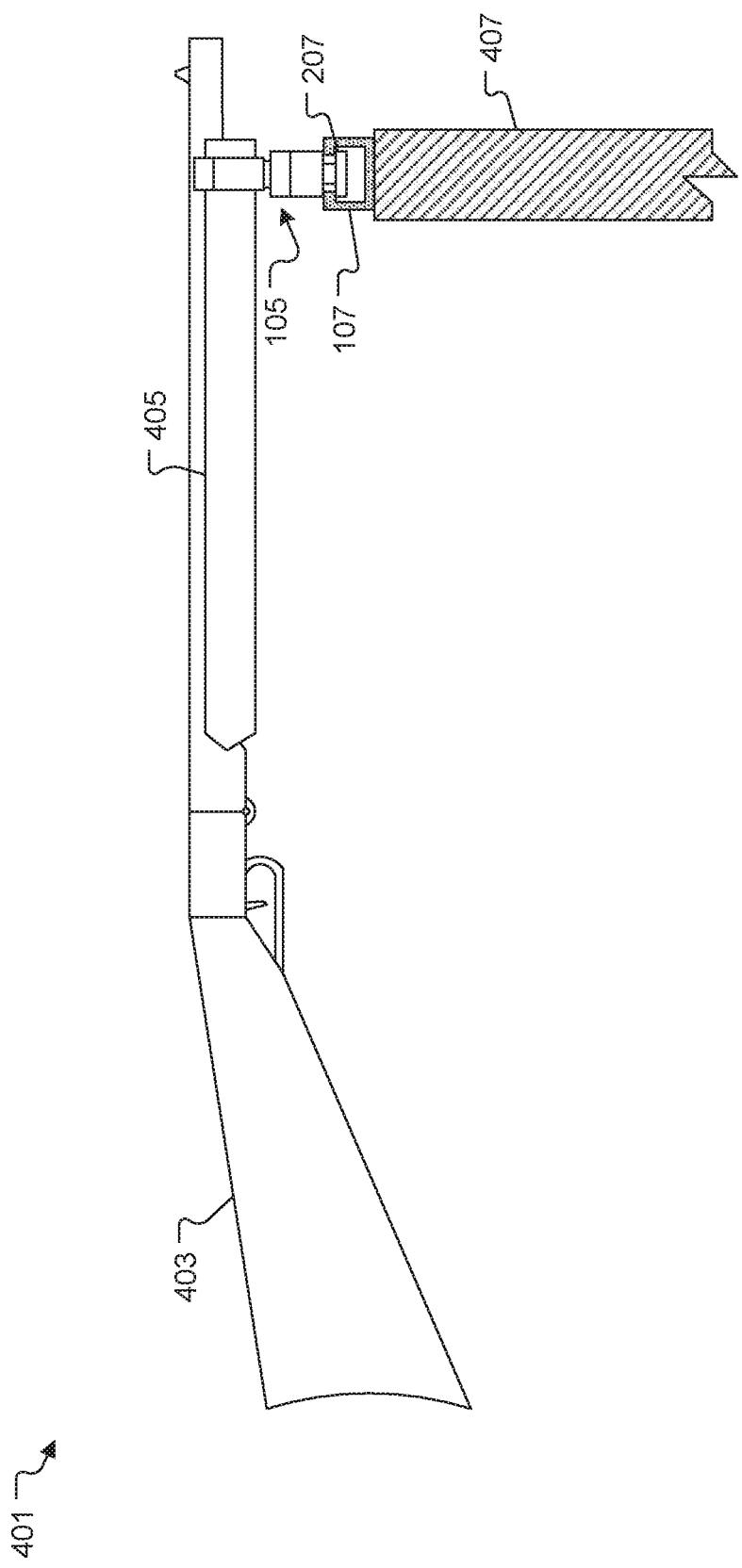
FIG. 4 is a cross-sectional side view of the system of FIG. 1 in use.

The use 401 of the system 101, as depicted by FIG. 4 includes a firearm 403 that is supported by the rest 105 via the forearm 405 or barrel. The slide 207 engages with the rail 107 that rests on wall 407. The slide 207 allows the rest 105 to move along rail 107. The hunter or user then aims the firearm 403 and the rest 105 moves to the corresponding position on the rail 107. As desired the brakes are used to prevent motion of the rest 105 or to stabilize the rest 105. The firearm 403 is then aimed and discharged.

It should be appreciated that one of the unique features believed characteristic of the present application is that the user does not move or reposition their body when aiming the firearm 403 as the rest 105 slides along the rail 107. Further, the user may remain seated and move the firearm 403 in the rest 105 while sliding along the rail 107

Figure 5:
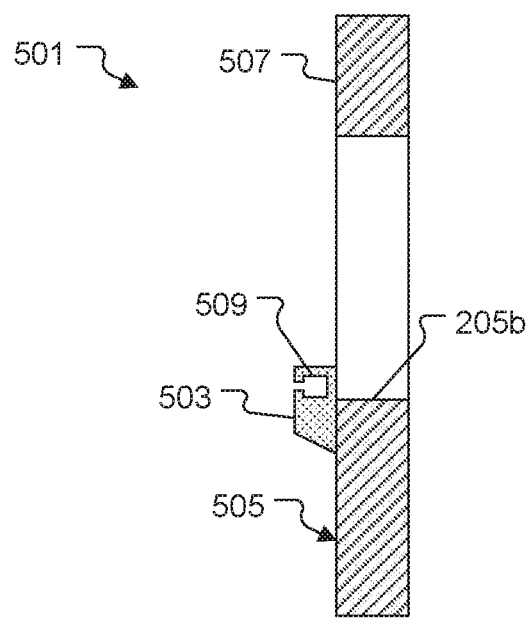
FIG. 5 is a cross-sectional side view of an alternative embodiment of the system of FIG. 1.
Figure 6:
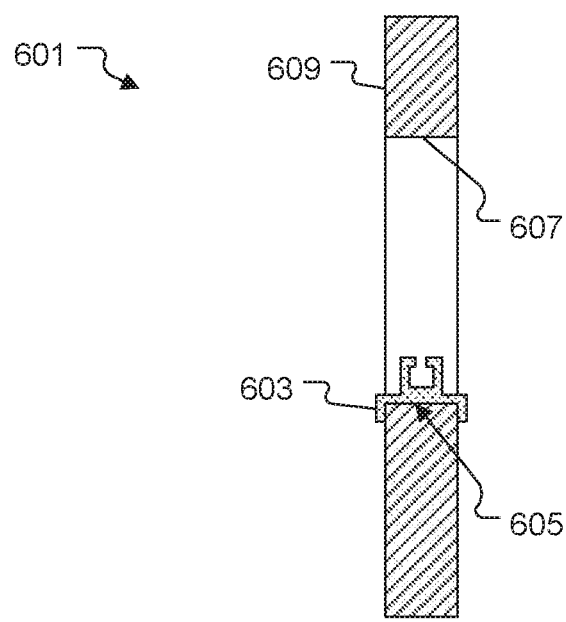
FIG. 6 is a cross-sectional side view of an alternative embodiment of the system of FIG. 1.

Referring now to FIGS. 5 and 6, alternative embodiments of the system 101 are depicted. While it has been depicted that the rail 107 is attached to the bottom of a window or cutout in a wall it is contemplated that in embodiment 501 the rail 503 is attached to the interior surface 505 of the wall 507 so that the firearm has access to the window 509. It is also contemplated that a track 509 faces the interior of the room, blind, or space. Further, as in embodiment 601, the rail 603 is attached over the bottom 605 of the window 607 or cutout in the wall 609. These examples are given to illustrate the concept of the invention and not to limit its scope. It will be understood that the rail could be attached anywhere so long as the firearm is able to be placed on the rest with access through the window, for example outside the blind attached to the outer wall.

Figure 7:
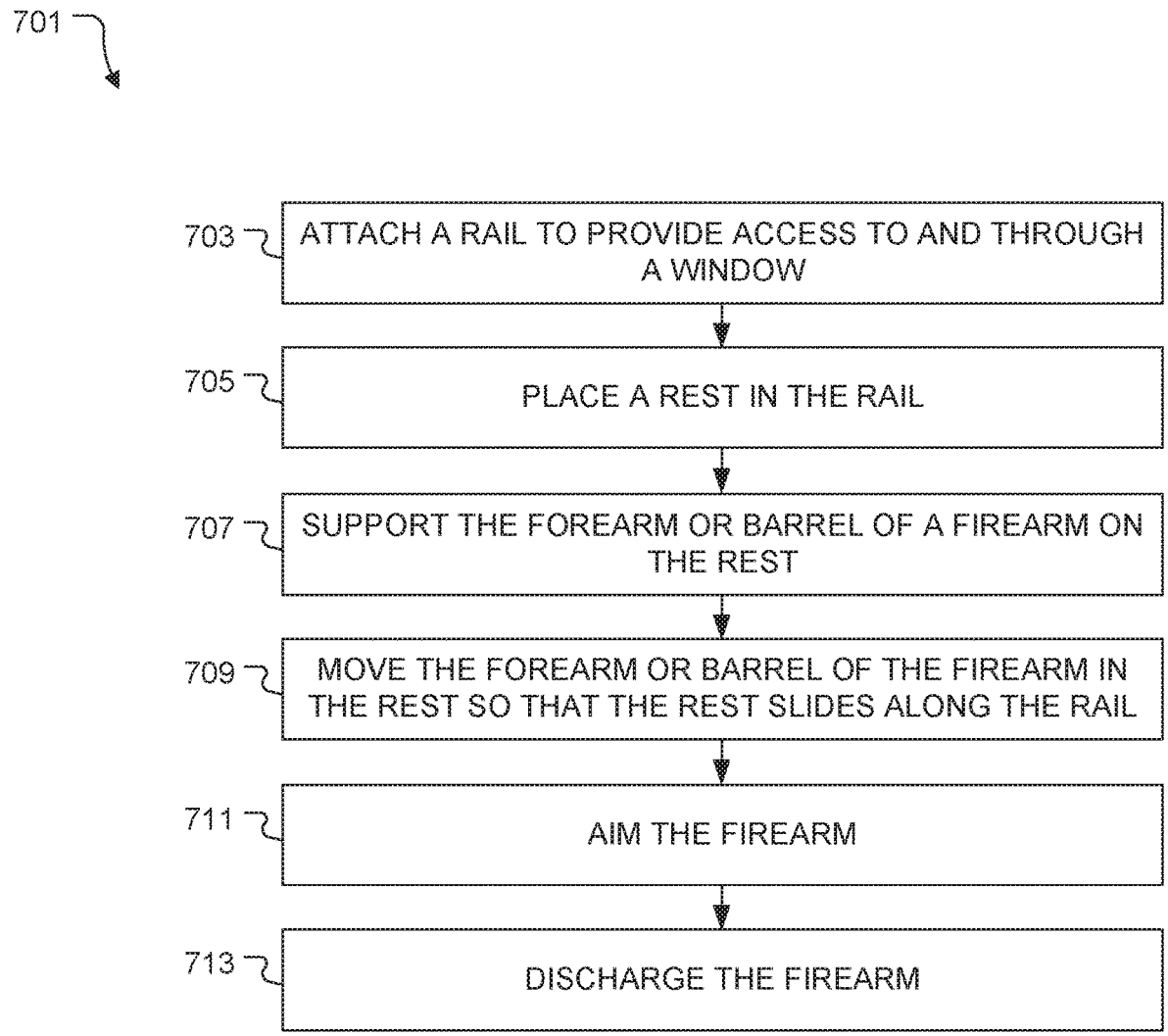
FIG. 7 is a flowchart of a method of supporting and aiming a firearm.

Referring now to FIG. 7 a method of supporting and aiming a firearm is depicted. Method 701 includes attaching a rail to provide access to and through a window 703, placing a rest in the rail 705, supporting the forearm or barrel of a firearm on the rest 707, moving the forearm or barrel of the firearm in the rest so that the rest slides along the rail 709, aiming the firearm 711 and discharging the firearm 713.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A sliding gun rest system comprising:
an elongated C-shaped rail permanently attached horizontally to or below a cutout of a wall;
a first body forming a U-shaped configuration, the first body is configured to hold the forearm or barrel of a firearm via the U-shaped configuration:
a second body pivotally attached to the first body, the first body is configured to rotate relative to the second body;
a T-shaped profile slide extending from the second body and configured to slidingly engage with the elongated C-shaped rail such that the second body slides along the rail across the full width of the wall cutout via the slide; and
a restraint system secured to the second body, operable from the left or right side of the second body and configured to stop sliding movement of the second body along the C-shaped elongated rail by pulling the T-shaped profile slide into the interior edges of the open side of the C-shaped rail;
wherein the one or more assemblies of the first body, the second body, and the C-shaped rail can be attached to the cutout of the walls of the blind without intrusion into an open space of the blind.

* * * * *

UNITED STATES PATENT AND TRADEMARK OFFICE
CERTIFICATE OF CORRECTION

| | | |
|---|---|---|
| PATENT NO. | : 12,135,181 B1 | Page 1 of 1 |
| APPLICATION NO. | : 16/997352 | |
| DATED | : November 5, 2024 | |
| INVENTOR(S) | : Drew F. Hunger | |

It is certified that error appears in the above-identified patent and that said Letters Patent is hereby corrected as shown below:

In the Specification

Column 1, Line 8: insert --to-- between "generally" and "shooting"

Column 1, Line 41: delete "point, this" and insert --point. This--

Column 3, Line 37: delete "window 509" and insert --window 109--

Column 4, Line 1: insert --,-- between "FIG. 7" and "a method"

Signed and Sealed this
Eighth Day of July, 2025

Coke Morgan Stewart
*Acting Director of the United States Patent and Trademark Office*